April 14, 1942.    W. R. POSTLEWAITE    2,279,340
CONVEYER FOR COATED PIPE
Filed Dec. 5, 1938    5 Sheets-Sheet 1
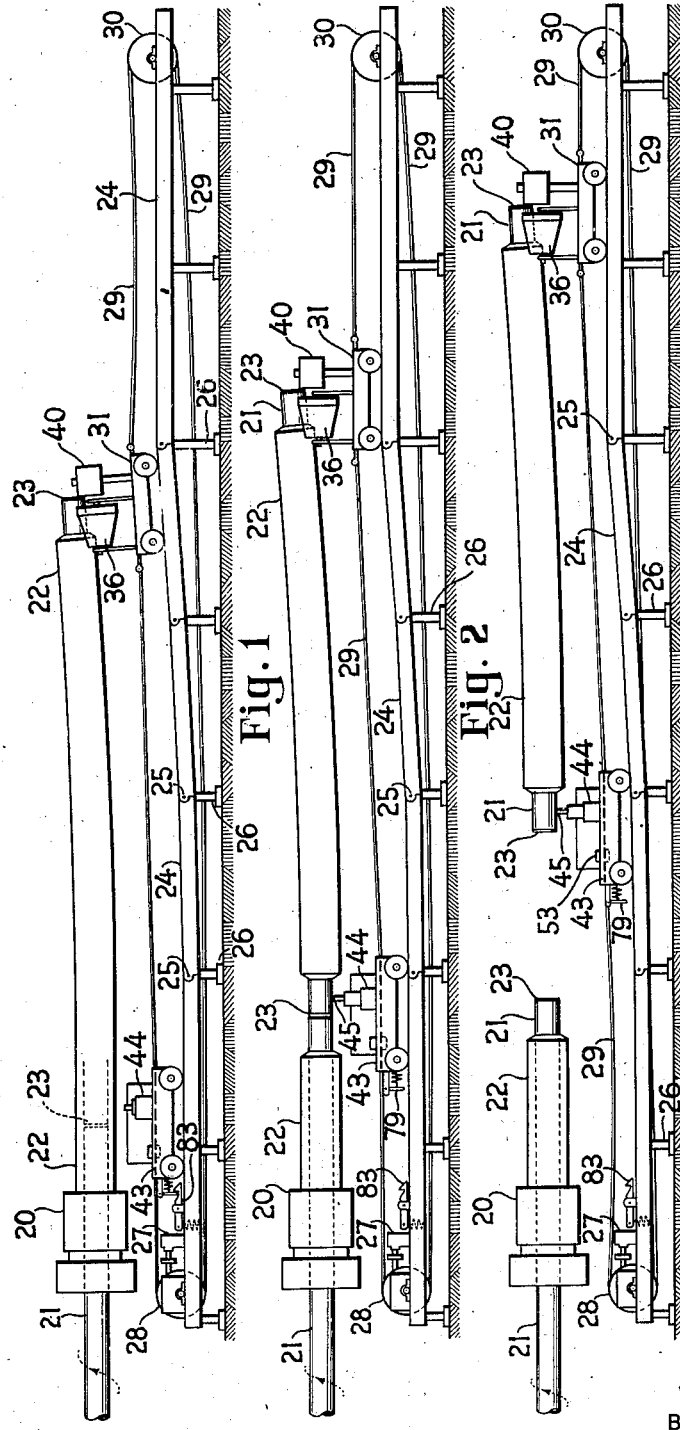
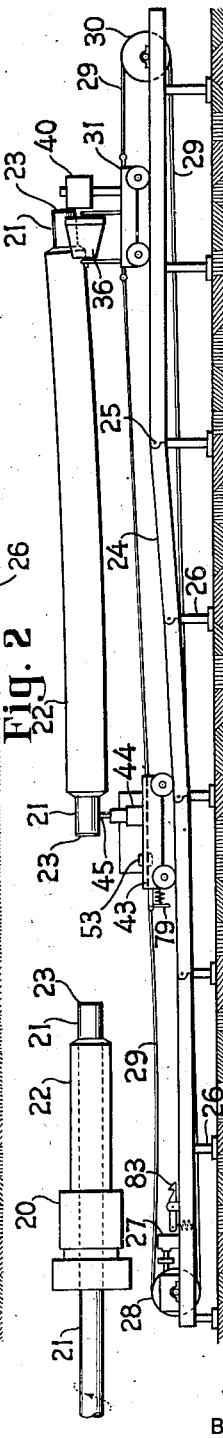
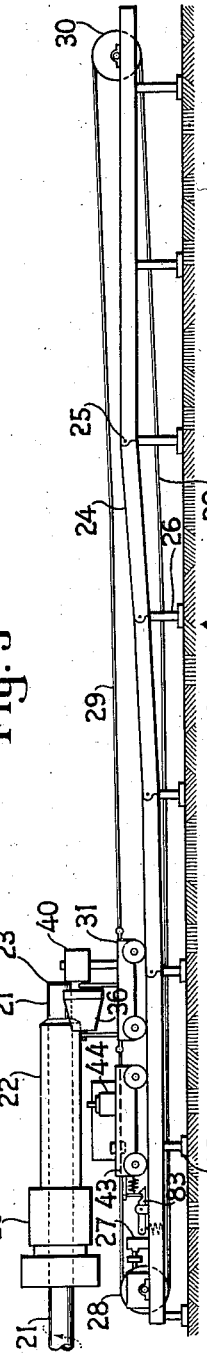
INVENTOR
WILLIAM R. POSTLEWAITE
BY
ATTORNEY April 14, 1942.  W. R. POSTLEWAITE  2,279,340
CONVEYER FOR COATED PIPE
Filed Dec. 5, 1938     5 Sheets-Sheet 2

INVENTOR
WILLIAM R. POSTLEWAITE
BY
ATTORNEY

April 14, 1942.  W. R. POSTLEWAITE  2,279,340
CONVEYER FOR COATED PIPE
Filed Dec. 5, 1938  5 Sheets-Sheet 3
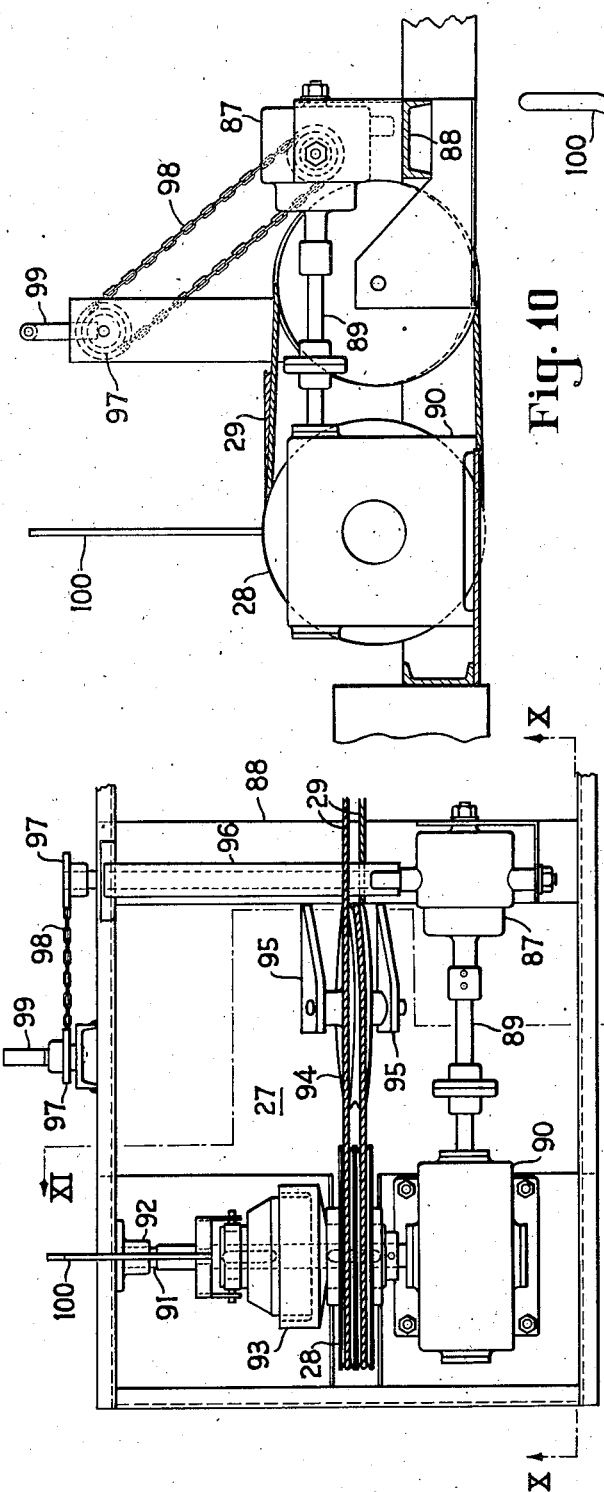
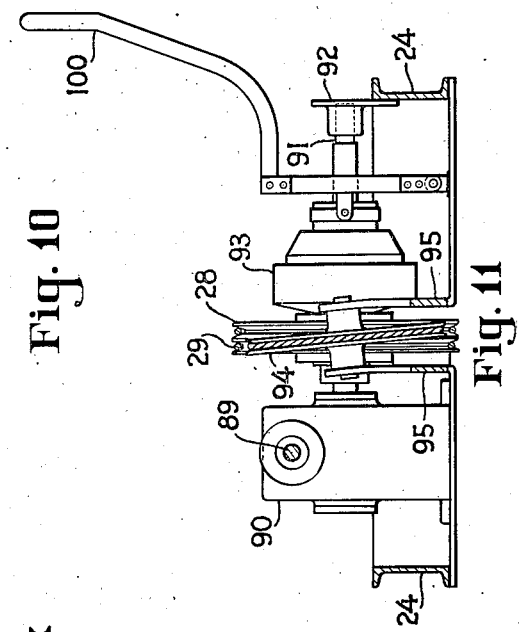
INVENTOR
WILLIAM R. POSTLEWAITE
BY
ATTORNEY

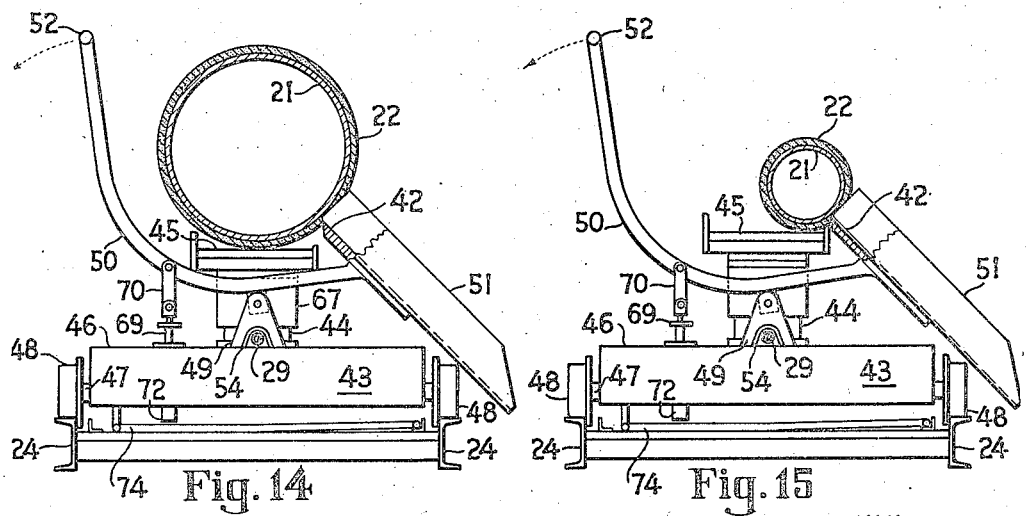
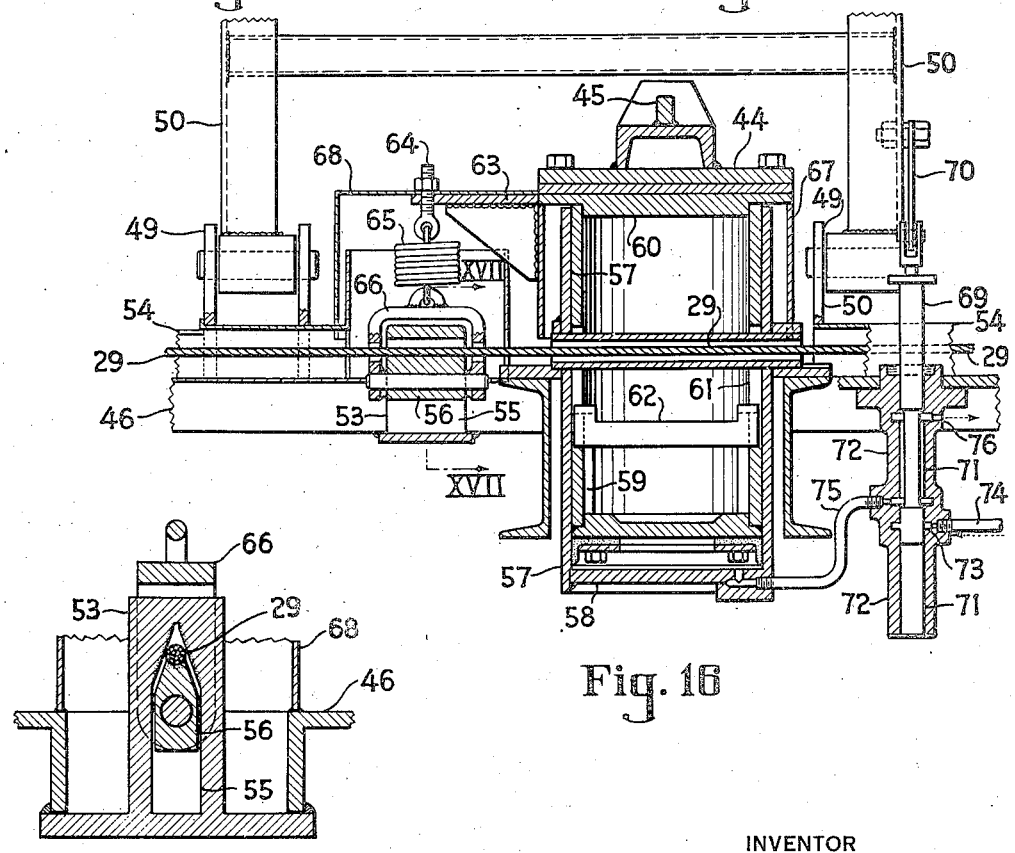

Patented Apr. 14, 1942

2,279,340

UNITED STATES PATENT OFFICE 2,279,340

CONVEYER FOR COATED PIPE

William R. Postlewaite, San Francisco, Calif., assignor to Standard Oil Company of California, San Francisco, Calif., a corporation of Delaware Application December 5, 1938, Serial No. 243,927

14 Claims. (Cl. 25—38)

This invention relates to a mechanism for receiving separate lengths of pipe or the like from a coating operation and is particularly directed to an improved means for supporting the coated lengths of pipe and conveying them away from the coating apparatus without interfering with the continuous operation of the latter.

Certain continuous pipe-coating operations, for example, that of my Patent No. 2,040,876 issued May 19, 1936, utilize an extrusion nozzle through which pipe is advanced helically as by the apparatus of Patent No. 2,112,865 issued April 5, 1938, to J. F. Putnam or of my co-pending application Ser. No. 243,928 filed Dec. 5, 1938, and in which a plastic bituminous material such as that of C. S. McDonald Patent No. 1,984,649 is applied to form a continuous, seamless, outer coating of appreciable thickness. The successive lengths of pipe which are thus coated may be coupled together during the coating operation by means of the device of my patent No. 2,077,769 issued April 20, 1937, which coupler is particularly adapted to be readily disconnected by an axial separation of the adjacent sections of pipe.

In a continuous pipe-coating operation, such as is described and claimed in the patents cited above, it is necessary that the successive lengths of coated pipe be received upon a suitable carrage or carriages as they emerge from the coating apparatus, separated, and removed to a place of storage. It is desirable that these carriages be rapidly returned to be in position for receiving the next length of pipe without interrupting or delaying the continuous operation of the coating process. It is also desirable that the coating material be removed for a short distance from the abutting ends of the pipe sections, not only to permit withdrawal of the couplings which have joined them during the coating process, but also to facilitate subsequent welding or other operations which will permanently join the pipe lengths into a continuous line.

This invention comprehends broadly an apparatus for receiving successive lengths of pipe, removing the coating for a short distance back from the ends, disconnecting the completely coated section from that still emerging from the coating nozzle and rapidly removing the free length from the machine so that it may be placed on a cooling or storage rack. During these operations it is desirable that the pipe be supported to preserve the alignment of that portion passing through the nozzle with the nozzle axis so that the thickness of the coating will be uniform and will not be distorted by uncontrolled sagging of the unsupported portion of the pipe.

It is an object of this invention to provide an apparatus for receiving and supporting a pipe or similar cylindrical member which is being coated with a relatively thick layer of a plastic material and which is followed by successive lengths of such members.

Another object is to provide an apparatus for exposing the ends of pipes or similar cylindrical objects which are successively advanced through a coating apparatus so that couplers or other means connecting adjacent lengths may be separated or withdrawn.

Another object is to provide a pipe-conveying apparatus which will separate successive lengths of coated pipe and advance the leading section to a point where it may be removed from the apparatus, the conveying apparatus being arranged to be rapidly returned to receive the next length of pipe.

Another object is to provide a pipe-conveying and handling apparatus that is sloped to compensate for the sag which occurs in long lengths of pipe to which a coating is being applied by an extrusion process.

Another object is to provide an apparatus of this nature which will require a minimum of manual operation and attendance and which will be positive in its action to receive and convey pipe from a coating machine.

These and other objects and advantages will be further apparent from the following description and from the accompanying drawings, which form a part of this specification and illustrate a preferred embodiment of an apparatus suitable for carrying out this invention.

In the drawings, Fig. 1 is a diagrammatic side elevation view of a pipe-coating and conveying apparatus constructed according to this invention, and illustrates a length of pipe which has been coated and is ready to be separated from a succeeding length yet in the coating machine.

Fig. 2 is a diagrammatic side elevation view of the apparatus of Fig. 1, showing the pipe after the coating has been removed for a short distance on each side of the abutting ends.

Fig. 3 is a diagrammatic side elevation view of the same apparatus, showing the completely coated and trimmed length of pipe separated from that pipe still in the machine and in position to be removed to a storage rack or the like.

Fig. 4 is a diagrammatic side elevation view of the apparatus of Figs. 1, 2 and 3, showing the trimmer car and the end car returned to a position to receive the next length of pipe emerging from the coating apparatus.

Fig. 9 is a plan view of a drive and control mechanism for the cable used to connect and to drive the end and trimmer cars.

Fig. 10 is a side elevation view on line X—X of Fig. 9.

Fig. 11 is an end elevation view on line XI—XI of Fig. 9.

Fig. 14 is a transverse sectional view on line XIV—XIV of Fig. 12, showing a large diameter pipe in place on the trimmer car and with the trimmer blade in position to remove the coating adjacent the joint between succeeding lengths of pipe.

Fig. 15 is a transverse sectional view on line XV—XV of Fig. 12, showing the trimmer car and blade in position to support a small diameter pipe.

Fig. 16 is a detailed sectional view on line XVI—XVI of Fig. 12, illustrating a control means and one arrangement of a pipe support jack and cable grip for the trimmer car.

Fig. 17 is a detailed sectional view on line XVII—XVII of Fig. 16, illustrating one form of cable grip.

Figure 7:
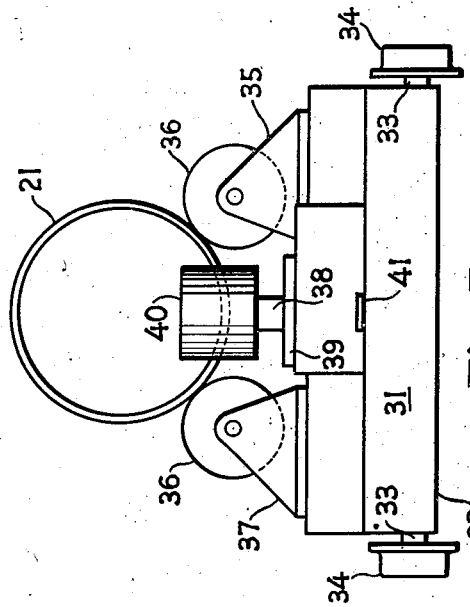
Fig. 7 is an end elevation view of the end car of Fig. 5, showing its arrangement when handling a large diameter pipe section.
Figure 8:
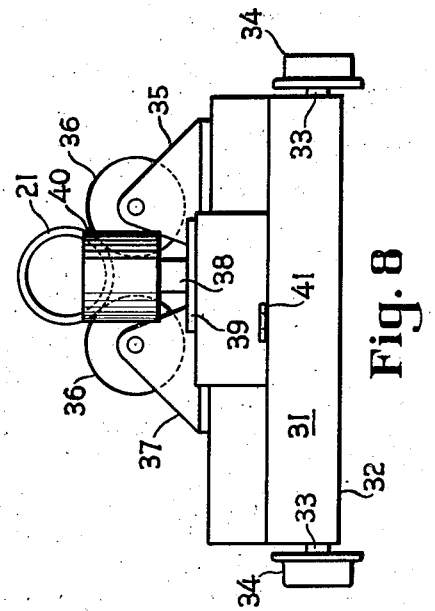
Fig. 8 is an end elevation view of the end car of Fig. 5, showing its arrangement when handling a small diameter pipe section.
Figure 5:
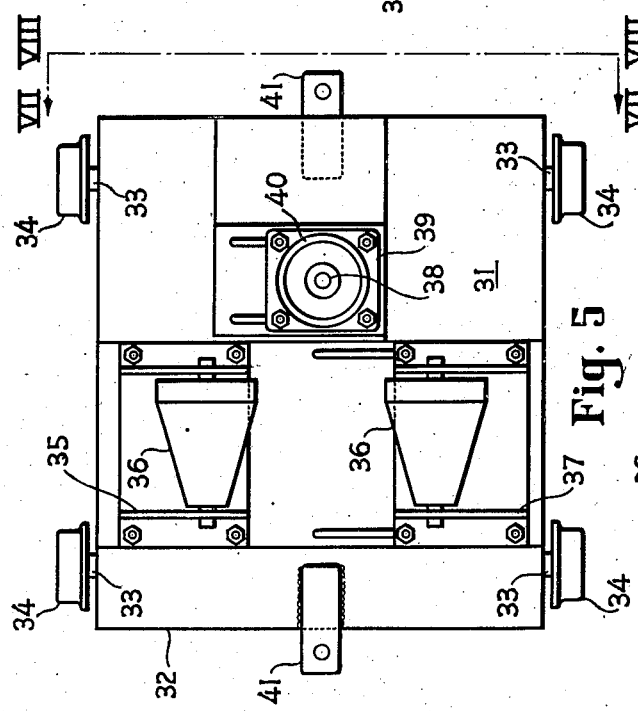
Fig. 5 is a plan view of the end car which receives and supports the advancing end of the pipe section being handled.

Referring to Figs. 1 to 4 inclusive, reference numeral 20 designates generally a coating apparatus which may be of the type described in my Patent No. 2,040,876 through which pipe 21 is advanced helically by suitable means such as by the apparatus of my co-pending application Ser. No. 243,928 filed December 5, 1938, which issued April 23, 1940, as Patent No. 2,198,178. Coating apparatus 20 may be continuously supplied with a plastic material 22, such as the bituminous mastic of the C. S. McDonald Patent No. 1,984,649, which comprises a graded mineral aggregate with a small proportion of a bituminous binder. As the pipe 21 advances through the coating apparatus 20, this material is extruded onto its outer surface in a concentric layer ranging from about ¼ to ¾ inch in thickness. Adjacent lengths of pipe 21 are preferably connected by means of separable couplers 23 which may be of the type shown in my Patent No. 2,077,769. These serve to align the abutting ends of the pipe sections and also act to transmit the helical motion from the following to the advancing length of pipe being coated. They are separable axially by a longitudinally acting force applied to the advancing length of pipe. Obviously, any other coupler which would permit of such separation or of removal from the pipe sections could equally well be used for this purpose.

A track 24 extends outwardly from the coating apparatus 20 and is parallel to the axis of the pipe 21. In order to compensate for the sag of the pipe being coated, which may be in lengths of 20 to 60 feet, track 24 is preferably made in sections hinged as at 25 and supported upon adjustable jacks 26 so that the track may be sloped upwardly for at least a part of its length. This will permit that portion of the pipe 21 that is passing through coating apparatus 20 to be co-axial thereto and will insure a concentric coating 22.

At one end of track 24 is a cable drive mechanism, generally designated 27, which is adapted to drive sheave 28 in either direction. A flexible metallic cable 29 passes around sheave 28 and extends the full length of track 24 to an idler sheave 30, returning to sheave 28 beneath track 24. In order to support the advancing end of pipe 21 as it passes outwardly along track 24 from coating means 20, an end car 31 is mounted upon track 24 and is connected at either end to cable 29.

Referring to Figs. 5, 6, 7 and 8, which show the detailed construction of end car 31, it will be noted that the car consists of a flat body 32 supported by transverse shafts 33 on which are journaled flanged wheels 34. A fixed bracket 35, at one side of the longitudinal axis of car 31, is adapted to support a partly tapered roller 36. A similar roller is supported in an adjustable bracket 37 on the opposite side of car 31. As the advancing end of pipe 31 contacts tapered rollers 36, it will ride up on them and finally come to rest on their cylindrical portions. A vertical shaft 38 is supported upon a movable base 39 and acts as a bearing for an end roller 40 against which the end of pipe 21 is adapted to bear as it pushes car 31 along track 24. Lugs 41 provide means for securing cable 29 to car 31.

It is usually desirable to expose pipe 21 for a short distance back from the abutting ends of the pipe sections. This operation is performed by removing the coating 22 at the trailing end of the leading section of pipe, and the leading end of the following section of pipe, as illustrated in Fig. 2. In this example the pipe is passed helically through coating apparatus 20 so that, if a trimmer blade or scraper is held against the coating and advanced longitudinally at the same rate that the pipe 21 advances longitudinally, the coating will be removed in a band extending completely around the pipe. Such an arrangement is illustrated in Figs. 2, 14 and 15, and preferably consists of a trimmer blade 42 pivotally supported upon a trimmer car 43. Car 43 is provided with a clamping means, to be described below, that may selectively be actuated to positively engage cable 29. As the leading section of pipe 21 passes outwardly along track 24 it will urge end car 31 along the track at the same rate. By clamping trimmer car 43 to cable 29, that car will be towed along by the end car at the same rate of longitudinal advance. Then if trimmer blade 42 is swung inwardly against the surface of pipe 21, it will remove a portion of the coating 22 in a uniform band extending around the pipe. The length of that portion of the leading section 21 of the pipe which is within the coating apparatus 20 being known, the operator can clamp trimmer car 43 at the junction between the advancing and following sections so that coupler 23 will be exposed and the 20 so that coupler 23 will be exposed and the coating removed for a short distance back from each of the abutting ends.

If a straight-through extrusion coating apparatus is used, i. e., one in which the pipe advances longitudinally without a rotational component of motion, it will be necessary to arrange trimmer blade 42 to move relatively to pipe 21 and coating 22 in order to remove the coating at the desired point. Such a modification could be made in various ways by anyone skilled in this art and need not be described in detail in this discussion, it being understood that the principal requirement is a blade or scraper movable relatively to the pipe surface, preferably in a plane at right angles to the pipe axis and independent of its longitudinal advance.

In order to be able to separate the leading section of pipe 21 from that section which is still passing through coating apparatus 20, it is necessary to provide some means to support the trailing end of the advancing section. In this example such means are mounted upon the trimmer car 43 and constitute a fluid actuated jack 44 on top of which is a transverse bar or cradle 45 which will contact the lower surface of pipe 21. The leading section of pipe 21, being supported at its advancing end by car 31 and at its trailing end by car 43, may be separated from the trailing section by urging cable 29 to advance at a more rapid rate than the longitudinal component given to the pipe 21 by the feed device which advances the successive sections through the coating apparatus 20.

Figs. 12 to 15 illustrate in some detail the construction and operation of trimmer car 43. That car has a flat bed or body 46 supported by transverse shafts 47 on which are mounted flanged wheels 48. A pair of brackets 49 pivotally support a frame 50, to one end of which is secured the trimmer blade 42 previously mentioned. This blade is provided with a hardened edge parallel to the axis of pipe 21 and is inclined downwardly so that the coating material which is removed will slide freely into a chute 51, and away from car 43 and track 24. Handle 52 on frame 50 is adapted to be grasped by an operator and pulled outwardly away from the pipe axis, thus rotating frame 50 in brackets 49 and lifting the trimmer blade 42 into contact with the side of pipes 21 to remove a section of coating 22 therefrom.

The desirability for positively connecting cars 31 and 42 together during the removal of the coating 22 adjacent the coupling 23 and for a period of time thereafter during which the leading pipe section 21 is separated from that section still in the machine, has already been explained. In this example such connection is made automatically by a cable grip generally designated 53, which is actuated by the pivoted frame 50 at the time that that frame is moved to engage the trimmer blade 42 with pipe 21. Referring to Figs. 14 to 17 inclusive, it will be noted that trimmer car 43 is provided with a longitudinal housing 54 through which the flexible cable 29 is adapted to pass. Intermediate the ends of housing 54 is a cable grip 53 provided with a vertical slot 55, the upper portion of which is converging and is preferably coated with a hard facing material, for example, an arc weld deposit of a metallic carbide. A follower block 56 is adapted to move vertically in the lower part of slot 55 and is likewise provided with a hard facing material on its upper surface. Cable 29 passes through slot 55 between follower block 56 and the upper end of that slot so that a vertically upward motion of block 56 will cause the cable to be gripped, preventing relative motion between the cable and trimmer car 43.

Fig. 16 illustrates in some detail a preferred interlocking arrangement between the frame 50 for trimmer blade 42, the cable grip 53 and the fluid actuated jack 44, all of which are actuated substantially simultaneously. The fluid actuated jack comprises essentially a cylinder 57 closed at the bottom by means of a plate 58 and provided with a piston 59. The upper end of piston 59 terminates in a plate 60 on which is mounted the transverse bar or cradle 45 which engages the lower part of pipe 21 to support the same. Piston 59 is slotted as at 61 to permit housing 54 for cable 29 to pass through cylinder 57 so as to be aligned with cable grip 53. A spacer block 62 may be inserted in the lower end of slot 61 to limit the upward travel of piston 59 so that it may be adjusted for different diameters of pipe 21.

A bracket 63 extends outwardly from one side of plate 60 and is connected to follower block 57 of cable grip 53 by means of an eye bolt 64, spring 65 and clevis 66. To prevent pieces of the coating 22 which are removed by trimmer blade 42 from interfering with the operation of jack 44 and cable grip 53, housing members 67 and 68 may be provided for those two means.

Figure 6:
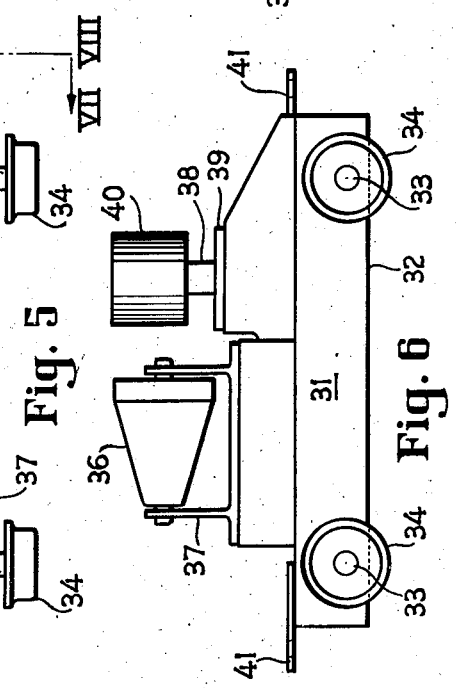
Fig. 6 is a side elevation view of the end car of Fig. 5.
Figure 12:
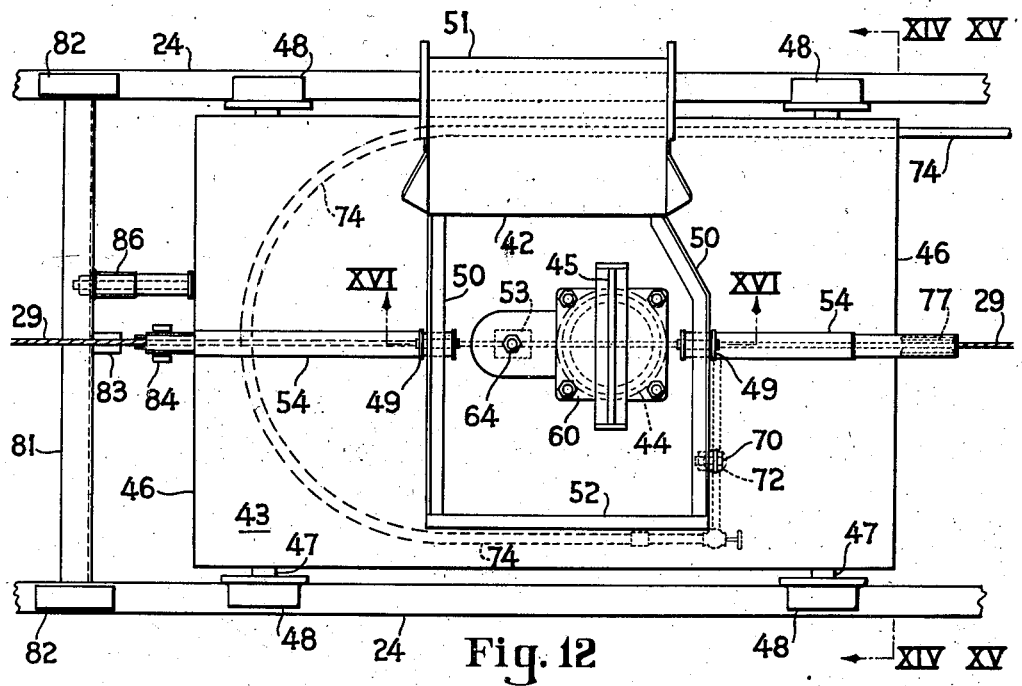
Fig. 12 is a plan view of the trimmer car, showing the arrangement of the pipe support jack, the trimmer blade and apron, and the latch mechanism to retain the trimmer car in position adjacent the coating apparatus during a predetermined part of the operating cycle.
Figure 13:
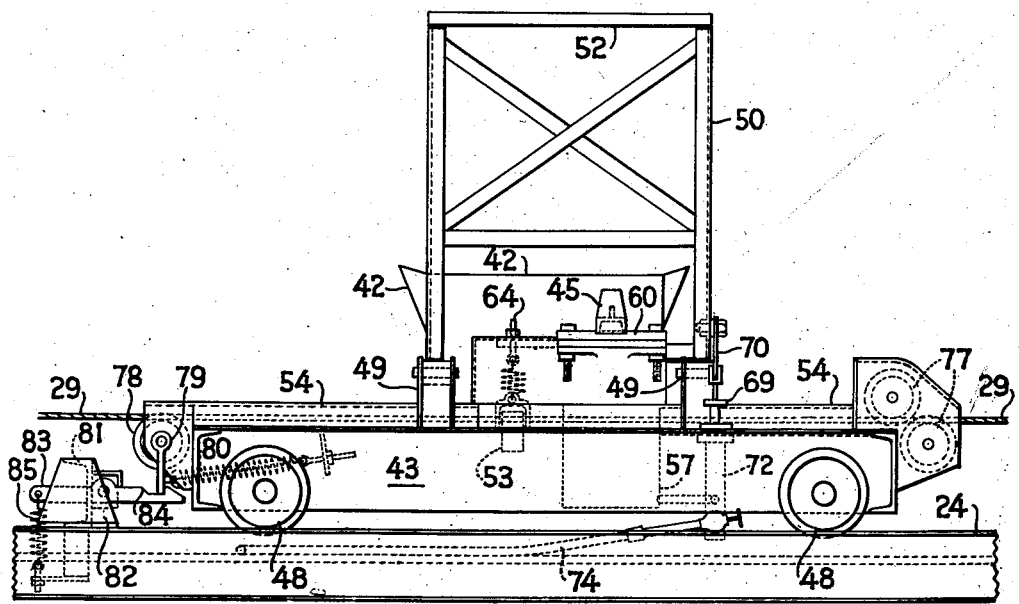
Fig. 13 is a side elevation view of the trimmer car shown in Fig. 12 and illustrates in more detail the latch mechanism and cable tow attachment for the trimmer car.

The interlocking arrangement for trimmer blade 42, jack 44 and cable grip 53 is best shown in Fig. 16 and in this example constitutes a fluid control valve 69 connected to frame 50 by means of a pivoted link 70. Valve 69 is adapted to move in bore 71 of valve body 72. An air admission port 73 is supplied from any suitable source of compressed air by means of hose 74, which lies between the side members of track 24 and is of such length that it will permit car 42 to travel substantially the full length of track 24. Fluid control valve 69 is of the piston type and in its lowest position is adapted to connect air admission port 73 with a conduit 75, which leads from the bore of valve body 72 to the bore of cylinder 57 of jack 44, thus admitting air to that cylinder and raising piston 59, which in turn will raise transverse bar 45 to engage pipe 21 and will raise follower block 56 to clamp cable 29 in cable grip 53. Link 70 is so connected to pivoted frame 50, carrying trimmer blade 42, that the operation just described will occur substantially simultaneously with the removal of the short section of coating 22 adjacent the abutting ends of the leading and trailing sections of pipe 21 (Fig. 2). When valve 69 is returned to its upper portion, as shown in Fig. 6, by a reverse motion of frame 50 and blade 42, conduit 75 is connected to an air discharge port 76 at the upper end of valve body 72, thus releasing the air or other actuating fluid from cylinder 57 and permitting jack 44 and cable grip 53 to return to their lower positions, illustrated in Fig. 16.

At either end of cable housing 54 on car 43, it is preferred to mount guide pulleys 77 and 78. In order to retain trimmer car 43 at the left end of track 24 in position to receive the trailing end of the leading pipe section 21, it is desirable to provide a latch means which will engage a part of car 43 and hold it against the unavoidable friction between cable grip 53 and cable 29 while end car 31 is being pushed along track 24 by the advancing outer end of pipe 21. Under some conditions of operation it may be desirable to adjust bolt 64 on cable grip 53 so that follower block 56 will always bear with some degree of friction against cable 29, for a purpose which will be explained in greater detail below.

In this example the latch means just mentioned comprises a lug 79 pivoted to the rear end of car 43 and urged toward the car by a spring 80. A transverse member 81 extends across track 24 and is provided with stop members 82 so that wheels 48 of trimmer car 43 will not pass to the left of a desired point. Intermediate the ends of transverse member 81 is a pivoted latch 83 provided with a notch 84 to receive the lower end of the hinged lug 79 on car 43. A spring 85 urges latch 83 to its closed position. Suitable adjusting means are provided for springs 80 and 85 so that positive actuation of cable grip 53, by the means outlined above, will permit lug 79 to rotate through a few degrees and slip out of notch 84, thereby permitting car 43 to travel with cable 29 and end car 31. A spring buffer 86 may be provided to absorb the shock of car 43 being returned to the left end of track 24 so that the engagement of lug 79 in notch 84 will be positive.

Earlier in this description mention was made of a cable drive, generally designated 27, which was adapted to drive sheave 28 and cable 29 in either direction. A preferred arrangement of such a drive is best illustrated in Figs. 9, 10 and 11. It will be appreciated that cable 29 must be free to be moved by car 31 during the operations described above. As soon as trimmer car 43 has been latched to cable 29 so that jack 44 will support the trailing end of the leading section of pipe 21 and after the end mastic has been trimmed off it is contemplated that cable drive 27 will be placed in operation to move car 31 rapidly toward the right end of track 24. This will separate the two parts of coupler 23, as shown in Fig. 3, or will pull one end of the coupler from one length of pipe, and will place the finally coated length of pipe in position to be removed from cars 31 and 43 by an overhead hoist or the like (not shown). As soon as this length of pipe is removed from the cars, it is desirable that jack 44 be lowered to retract bar 45, and both cars 43 and 31 be quickly returned to the left end of track 24 so that car 31 will be in position to receive the continuously advancing end of the succeeding length of pipe 21 which is emerging from the coating apparatus 20. For this reason the cable drive means 27 is preferably arranged to be idle during a portion of the cycle of operations and to be actuated in either direction during the remaining part of the cycle.

In this example a reversible motor 87, such as an air motor, is secured to a transverse member 88 at the left end of track 24. Compressed air or other actuating fluid for motor 87 may be supplied from the same source as that used for the fluid jack 44 on car 43. Motor 87 is connected by shaft 89 to a speed reducer 90, the latter having a shaft 91 extending transversely of track 24 to a bearing 92. A clutch mechanism 93 is mounted on shaft 91 and is adapted to drive sheave 28, this being the main drive sheave for cable 29. In this example sheave 28 is arranged to receive two wraps of cable 29 to increase its effective driving area of contact, thus requiring an inclined idler sheave 94 on brackets 95. Any suitable reversing control means may be provided for motor 87, such as shaft 96, sprockets 97, chain 98 and handle 99. To operate the drive means, handle 99 of the reversing gear for motor 87 is moved to the desired position and clutch 93 is engaged by moving handle 100 to connect the motor 87 through speed reducer 90 to drive sheave 28.

Although the operation of each of the various component parts of this apparatus has been described in some detail, it is believed that a repetition of one cycle will be of value. Assuming that a section of pipe 21 is being advanced by any suitable means through pipe-coating apparatus 20 (as shown in Fig. 4), the leading end of that pipe will be received on tapered rollers 36 of end car 31, thus pushing that car along the inclined track 24, car 31 acting to move cable 29 at the same longitudinal rate as the end of the pipe. Car 43 is retained in position by latch 83, and cable drive mechanism is, for the time being, in its idle or free position. As soon as the leading length of pipe has passed through the coating mechanism and has assumed the position shown in Fig. 1, the operator moves handle 52 of frame 50 to raise the trimmer blade 42 into contact with the coated pipe at a point opposite coupler 23. At the same time that the rotational component of the pipe motion causes blade 42 to remove a portion of the coating, jack 44 is actuated to raise transverse bar or cradle 45 to engage the cleaned trailing end of the leading pipe section 21. Simultaneously cable grip 53 is actuated by jack 44 so that car 43 is positively connected to cable 29 and is towed along track 24 by car 31. The cable drive 27 is then actuated to move cable 29 and cars 31 and 43, which latter carry the leading section of pipe 21, rapidly along track 24 to separate the leading from the trailing sections of pipe. This places the section of pipe on the cars in position to be removed, as by an overhead hoist, so that the two cars are free to be returned to their original position at the left end of track 24. This operation is performed by reversing the motor 89 of cable drive 27. The weight of frame 50 and cutter blade 42 is preferably so distributed that the cutter blade will return to its lowered position when the operator releases handle 52, causing jack 44 and cable grip 53 to be retracted. The partial tension of cable grip 53, mentioned above, will cause the now empty car 43 to return to the left end of track 24 and to engage latch 83. A further motion of the cable through grip 53 will be permitted and will serve to return end car 31 to receive the end of the next section of pipe, as in the position shown in Fig. 4, after which the same cycle may be repeated.

It will be appreciated that this apparatus will receive and support successive and varying lengths of pipe, or the like, from a continuous coating operation, separate these lengths for disposal and will compensate for the sagging or deflection of the long lengths while they are emerging from the coating equipment. Although a specific construction has been described and illustrated, it is obvious that many changes and modifications can be made without departing from the essential features of the invention, and all such modifications as are within the scope of the following claims are embraced thereby.

I claim:

1. A pipe conveying apparatus for receiving successive abutting lengths of pipe or the like being discharged from a treating operation, comprising a support means for receiving the advancing end of an axially moving length of treated pipe, said means being movable to be advanced by said pipe, a second independently movable support means for receiving the trailing end of said pipe section, means for connecting said first and second support means while said pipe is supported thereby, and means including said connecting means for returning both said support means to receive a succeeding length of pipe, the return movement of said support means being in the same plane as the advance movement of said means.

2. A pipe conveying apparatus according to claim 1, with the addition of means independent of the pipe for advancing said movable support means to separate that section of pipe on said support means from a succeeding length of pipe emerging from said pipe treating operation.

3. A pipe conveying apparatus according to claim 1, with the addition of means on said second support means movable with respect to said pipe, for removing a portion of the coating on each side of the abutting ends of said successive lengths of pipe.

4. A pipe conveying apparatus according to claim 1, with the addition of a track for said movable support means, said track being sloped upwardly to compensate for the sag of said coated pipe as it is received by said support means.

5. A conveying apparatus for receiving successive abutting lengths of pipe or the like being discharged axially from a continuously operating coating machine, comprising a car supporting the advancing end of a length of pipe being coated and movable to be advanced by the axial motion of said pipe length, a second car having vertically extensible means for supporting the trailing end of said pipe section after it emerges from said coating machine, means for selectively connecting said cars, and means for returning said cars to receive a succeeding length of pipe.

6. A conveying apparatus according to claim 5, with the addition of means for advancing said cars after they have been connected, at a rate more rapid than the axial advance of said pipe, to separate the length of pipe supported on said cars from a succeeding length of pipe.

7. A conveying apparatus according to claim 5, in which the pipe coating machine is of the extrusion type, and with the addition of a track for said cars, sloped with regard to the axis of said coating machine to compensate for the sag of said coated pipe so that that portion of the pipe passing through said extrusion coating machine will remain substantially coaxial thereto at all positions of said cars on said track.

8. A conveying apparatus according to claim 5, with the addition of a trimmer blade on said second car for cleaning a portion of coating from said pipe adjacent the end thereof.

9. A conveying apparatus according to claim 5, in which the means for selectively connecting said cars comprises a flexible cable, and with the addition of means for selectively driving said cable to advance said cars and separate said pipe sections, and to return said cars to receive a succeeding length of pipe.

10. A conveying apparatus for receiving successive lengths of pipe or the like being discharged axially from a continuously operating coating machine, comprising a car supporting the advancing end of a length of pipe being coated and movable to be advanced by the axial motion of said pipe length, a second car supporting the trailing end of said pipe section after it emerges from said coating machine, means for selectively connecting and disconnecting said cars, said means including a tension element secured to said first car and means on said second car for engaging said tension element, and means for returning said cars in the same plane as their advance to receive a succeeding length of pipe.

11. A conveying apparatus for receiving and separating successive abutting lengths of pipe or the like being discharged axially from a continuously operating coating machine, comprising a single track extending axially from said machine, a first car on said track for receiving the leading end of a length of pipe, a second car on said track for receiving the trailing end of said length of pipe, a cable extending throughout said track and secured to said first car, means on said second car for clamping it to said cable to space it from said first car, and reversible drive means for said cable to advance both of said cars at a rate more rapid than the axial advance of said pipe out of said coating machine to separate said length of pipe from a succeeding length and to return both of said cars on said track to a point adjacent to the discharge end of said coating machine.

12. A conveying apparatus according to claim 11, with the addition of means on said second car for cleaning a portion of the coating from both pipes adjacent their abutting ends, extensible means on said car for receiving the cleaned portion of the trailing end of the leading pipe section, and means for sequentially operating said cleaning and said receiving means when said cable clamping means are actuated.

13. A pipe conveying apparatus for receiving successive lengths of pipe or the like being discharged axially from a treating operation, comprising an axially movable support means for the advancing end of a length of treated pipe, a second axially movable support means for the trailing end of said length of pipe, and guide means for said first and second support means extending axially from said pipe treating apparatus, said guide means being inclined to compensate for the sag of said pipe as it emerges from said treating operation to maintain that portion of the pipe still in said apparatus coaxial therewith.

14. A pipe conveying apparatus for receiving successive abutting lengths of pipe or the like being discharged substantially horizontally from a coating operation, comprising a support means for receiving the advancing end of an axially moving length of treated pipe, said means being movable to be advanced by said pipe, a second independently movable support means for the trailing end of said pipe length, said second named means having a portion so constructed and arranged as to be selectively extensible upwardly to receive said trailing end of said pipe length, and means for returning both said support means in the same plane as their advance to receive a succeeding length of pipe, the extensible portion of said second named support means adapted to be lowered during said return to clear the coating on said succeeding pipe length.

WILLIAM R. POSTLEWAITE.